US006147486A

United States Patent [19]

Koss et al.

[11] Patent Number: 6,147,486

[45] Date of Patent: Nov. 14, 2000

[54] DEVICE FOR ANALYZING AN ALTERNATING VOLTAGE OR CURRENT INCLUDING A VARIABLE D.C. COMPONENT

[75] Inventors: Thomas Koss, Reutlingen; Guenter Nasswetter, Gomaringen, both of Germany

[73] Assignee: Robert Bosch GmbH, Stuttgart, Germany

[21] Appl. No.: 09/123,871

[22] Filed: Jul. 28, 1998

[30] Foreign Application Priority Data

Jul. 31, 1997 [DE] Germany ........................... 197 32 960

[51] Int. Cl.$^{7}$ ........................................................ G01P 3/48

[52] U.S. Cl. ...................... 324/166; 324/173; 324/207.12

[58] Field of Search .................................... 324/166, 161, 324/173, 174, 175, 207.2, 207.21, 207.25, 225, 207.12, 207.23, 168; 327/74

[56] References Cited

U.S. PATENT DOCUMENTS

| | | | |
|---|---|---|---|
| 5,103,171 | 4/1992 | Petersen | 324/207.23 |
| 5,554,948 | 9/1996 | Hansen et al. . | |
| 5,650,719 | 7/1997 | Moody et al. | 324/166 |
| 5,917,320 | 6/1999 | Scheller et al. | 324/166 |
| 5,926,016 | 7/1999 | Pattantyus | 324/166 |

FOREIGN PATENT DOCUMENTS

| | | |
|---|---|---|
| 0 006 482 | 1/1980 | European Pat. Off. . |
| 0 735 679 A1 | 10/1996 | European Pat. Off. . |
| 42 05 352 C2 | 5/1994 | Germany . |
| 94/18754 | 8/1994 | WIPO . |

*Primary Examiner*—Christine K Oda
*Assistant Examiner*—Subhash Zaveri
*Attorney, Agent, or Firm*—Michael J. Striker

[57] ABSTRACT

The analysis or evaluation circuit for analyzing an alternating voltage or current signal that includes a D.C. voltage or D.C. current component includes a window comparator having a circuit portion for comparing the alternating voltage or current signal to an upper threshold and a lower threshold and another circuit portion for adjusting the upper and lower threshold when one of the upper and the lower thresholds is reached by the alternating voltage or current signal. By means of a VCL output signal that switches when a threshold adjustment occurs, a frequency dependent signal may be produced that can be analyzed to obtain a rotational speed of a rotational body from which the input alternating voltage or current is derived.

7 Claims, 2 Drawing Sheets

DEVICE FOR ANALYZING AN ALTERNATING VOLTAGE OR CURRENT INCLUDING A VARIABLE D.C. COMPONENT

BACKGROUND OF THE INVENTION

1. Field of the Invention

The present invention relates to a device for analyzing an alternating voltage or current signal that nay have a D.C. voltage or D.C. current component.

2. Prior Art

It is known that various measured variables can be determined by analyzing periodically varying alternating voltage or alternating current signals. Thus for example rotational speed or angular position measurements are performed with the help of inductive sensors, which detect a rotating body with a characteristic surface. Since the sensor is fixed in such measurements, a periodically oscillating voltage is induced by a rotating body in the sensor, for example an inductive sensor with a measuring coil. From the period of these signals the rotational speed or its angular position is determined with a suitable surface formed on the rotating body.

These devices for producing a rotation speed-dependent signal train are, for example, known in connection with the determination of angular position of the crankshaft or camshaft of an internal combustion engine. Usually a ferromagnetic wheel is connected with the concerned shaft. It is monitored or detected with the help of a sensor surrounding a coil. Since the induced voltage is, for one thing, strongly dependent on its amplitude and, for another, can be superimposed with an interfering voltage, measures are required which guarantee a clean separation of the useful signal from the background signal.

A device for acquiring pulse signals that permits separation of the useful signal from additional D.C. voltage components is described in German Patent DE-PS 42 05 352. This separation is performed with the help of offset compensation and a low-pass filter. Furthermore the low-pass-filtered output signal is compared with the unfiltered input signal in a comparator and thus a largely noise-free output signal is obtained at the output of the comparator. This circuit may however still not be optimally adjusted for different signals to be evaluated, and it does not have dynamic signal tunability.

SUMMARY OF THE INVENTION

It is an object of the present invention to provide an improved circuit means for analyzing an alternating voltage or current signal that may have a D.C. voltage or D.C. current component, that does not have the above-described disadvantages.

According to the invention, the circuit means includes a window comparator having adjustable upper and lower thresholds including means for comparing the alternating voltage or current signal to the upper and lower thresholds and means for adjusting the upper and lower thresholds when the alternating voltage or current signal reaches one of the thresholds.

The circuit means according to the invention has the advantage that a very reliable signal evaluation occurs independently of the strength of the D.C. voltage or current components. It is especially advantageous that signal strength changes have no negative effect on the signal evaluation. These advantages are attained when the alternating voltage or current signal to be evaluated is fed to a window comparator whose upper and lower thresholds are adjustable and both thresholds are changed as soon as the alternating voltage or current signal reaches one of the thresholds. In one advantageous embodiment both thresholds are shifted equally. An auxiliary voltage for producing this shift is generated and superimposed on the respective thresholds. A square wave or rectangular signal with a period from which the rotational speed is determined arises at the output of the window comparator.

Preferred embodiments of the invention having additional advantages are set forth in the appended dependent claims.

It is especially advantageous that the field of application of the invention extends to any alternating voltage or current signal. A reliable analysis over a wide rotational speed range is possible in connection with the rotational speed or angular position determination with rotating parts, especially shafts in motor vehicles.

Both the rotation speed of a generator and the start of rotation can be reliably determined in an application using the circuit means of the invention for analyzing the phase voltage of the generator.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
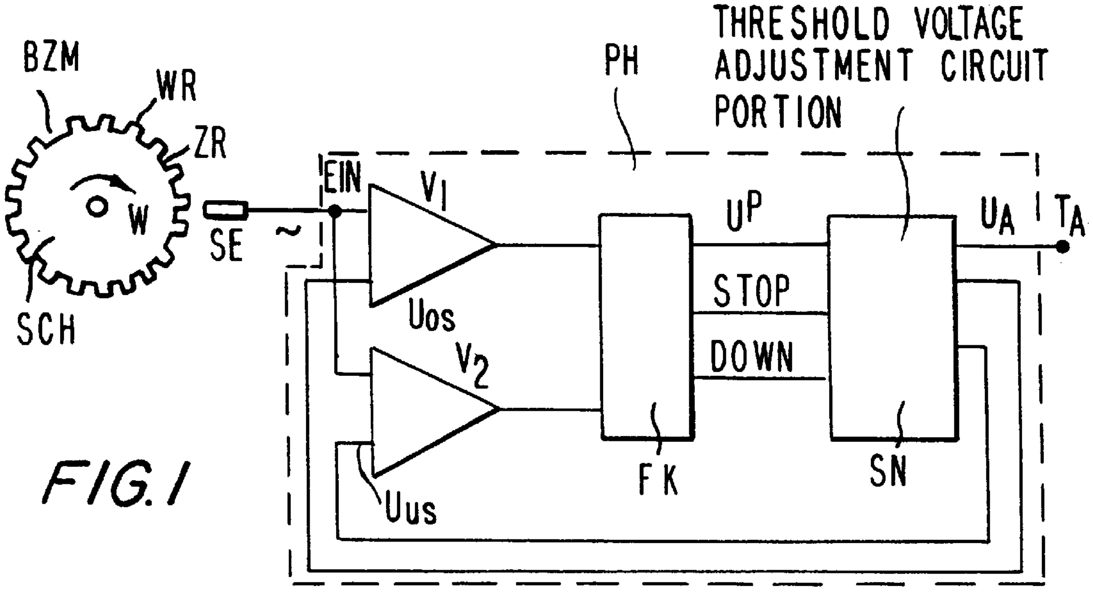
FIG. 1 is a schematic diagram of one embodiment of a circuit means according to the invention for determining rotational speed.

FIG. 1 shows an embodiment of the invention for a sensor signal analyzing circuit. The input voltage $U_E$ of the circuit according to the invention is an output voltage of a sensor SE that detects a rotating disk SCH with angular position marks WM and intervening spaces ZR. The rotating disk SCH is connected with a shaft W, which, e.g., is a crankshaft or camshaft of an internal combustion engine. An alternating voltage is produced in a sensor SE by moving the angular position marks WM and intervening spaces ZR past the sensor. The rotation speed of the shaft W can be determined from the period of the alternating voltage $U_E$. The alternating voltage $U_E$ can be converted into a rectangular voltage signal $U_A$ to simplify evaluation or analysis. This voltage conversion occurs with the help of the analyzer circuit according to the invention. The angular position of the shaft W can also be determined besides the rotational speed by analysis of the sides or the side spacing of the pulses of the rectangular signal. In cases in which a reference mark BZM is present on the disk SCH, this can also be determined by analysis of the prepared sensor signal in a known way.

The sensor output voltage is input as input voltage $U_E$ to the analysis circuit PH described in the following because the strength of the sensor output voltage depends strongly on the rotational speed, because a sensor SE based on the inductive principle is being used and because a D.C. voltage can be present in unsatisfactory conditions.

Also any arbitrary alternating voltage can be input to the circuit PH for analysis instead of the alternating voltage $U_E$.

For example, the phase voltage of an alternator that has an alternating component and necessarily a D.C. component for rotational speed determination of the generator can be fed to the circuit PH. Each alternating signal may be changed in the circuit means PH into a basically rectangular signal.

Analysis of the alternating voltage $U_E$ occurs in the circuit means PH that can be formed as a separate circuit or as a component part of the sensor SE or as a means for supplying other signals. The input of the voltage $U_E$ to be analyzed occurs via an input, EIN.

The circuit means PH comprises two comparators $V_1$ and $V_2$, which together with the circuit portion FK form a window comparator. The voltage $U_E$ is compared with an upper threshold value $U_{OS}$ and a lower threshold value $U_{US}$ by the comparators $V_1$ and $V_2$. If the alternating voltage is greater than the upper threshold value $U_{OS}$, the window comparator activates an up-counting process UP that activates a voltage adjustment by the a threshold adjustment circuit portion SN. Then both the upper threshold and the lower threshold are increased. When the voltage comparison determines that the voltage is within the voltage window, a stop signal is transmitted from the window comparator that suppresses the voltage adjustment. If the voltage is below the lower threshold value $U_{US}$, the window comparator produces a down-count signal DOWN and both the lower and the upper threshold are decreased by the threshold adjustment circuit portion SN. A rectangular signal is transmitted to the pulse output of the threshold adjustment circuit SN that changes its level on initiation of a voltage adjustment and contains information regarding the rotation speed. This information can be evaluated and for example supplied to a control unit of an internal combustion engine or to the voltage regulator, where it is used to set up a regulating strategy according to the measured rotation speed. The exact switching conditions for the voltage adjustment are summarized in FIG. 4.

Figure 2:
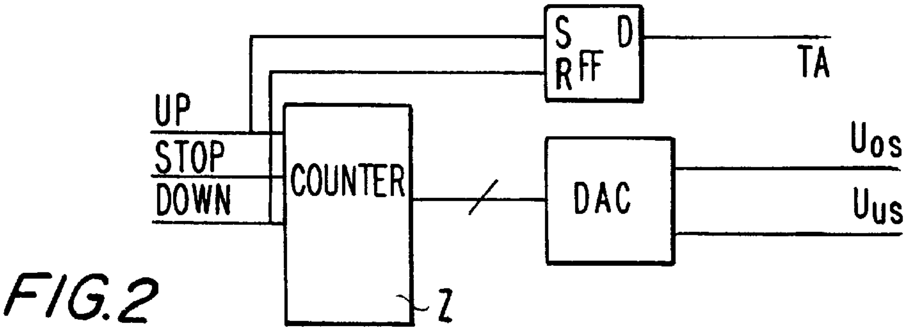
FIGS. 2 and 3 are portions of two possible circuits for voltage readjustment.
Figure 3:
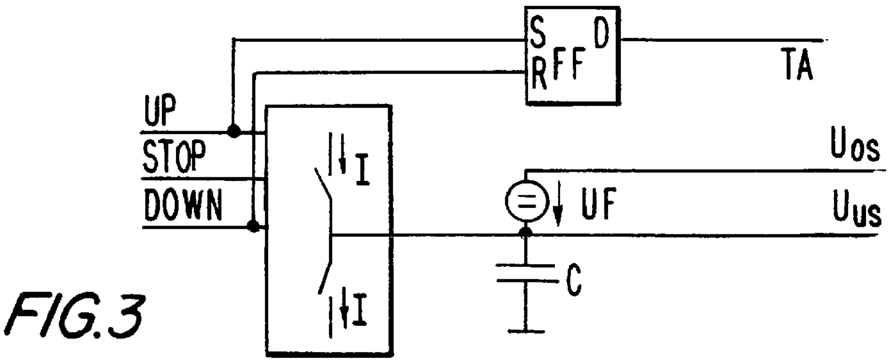

Two embodiments of the threshold adjustment circuit portion SN for voltage adjustment are illustrated in FIGS. 2 and 3. In the first embodiment according to FIG. 2 an n-bit up-down counter Z is provided, which is controlled with Up-Count, Stop and Down-Count signals from the window comparator. This counter Z counts upwards or downwards or remains at a constant count value according to the manner in which it is controlled. The counter state of the counter Z is converted into an analog voltage by a digital/analog converter DAC, that sets the upper and the lower threshold value $U_{OS}$ and $U_{US}$. If the input voltage exceeds the upper comparator threshold, the count direction of the counter Z is set to UP and the counter state and thus the auxiliary voltage is increased at a fixed count rate to such an extent that the input voltage is again found to be below the upper threshold. A switching of the count direction to Down occurs, when the voltage is below the lower threshold value, when it is considered that the lower threshold would be high. The voltage adjustment can be considered to produce an auxiliary voltage that is superimposed on both threshold values to shift the threshold values.

The above-mentioned threshold adjustment can be illustrated with the aid of FIG. 4 as follows: if the voltage reaches the upper threshold $U_{OS}$, the upper threshold is set high since the window comparator activates the counter Z to count upwards. At the same time also the lower threshold is also set high by the voltage adjustment, whereby the lower threshold is less greatly raised in region 1, since the circuit reaches its lower limit stop. After the voltage $U_E$ drops to a value corresponding to the lower threshold $U_{US}$, both thresholds are again returned to their original values. The next time the upper threshold is reached by the voltage the thresholds are again raised and after reaching the lower threshold are again reduced.

When the thresholds are raised, the set input S of the flip-flop FF connected with the Up-Count input of the counter Z is set. On reducing or resetting the thresholds a resetting of the flip-flop FF occurs. A VCL evaluation signal TA is thus produced at the output of the flip-flop FF, whose pulse spacing, for example, as determined from the respective rear pulse sides, is an exact measure for the frequency of the voltage. The output signal $U_A$ at TA changes its level with every threshold change.

Figure 4:
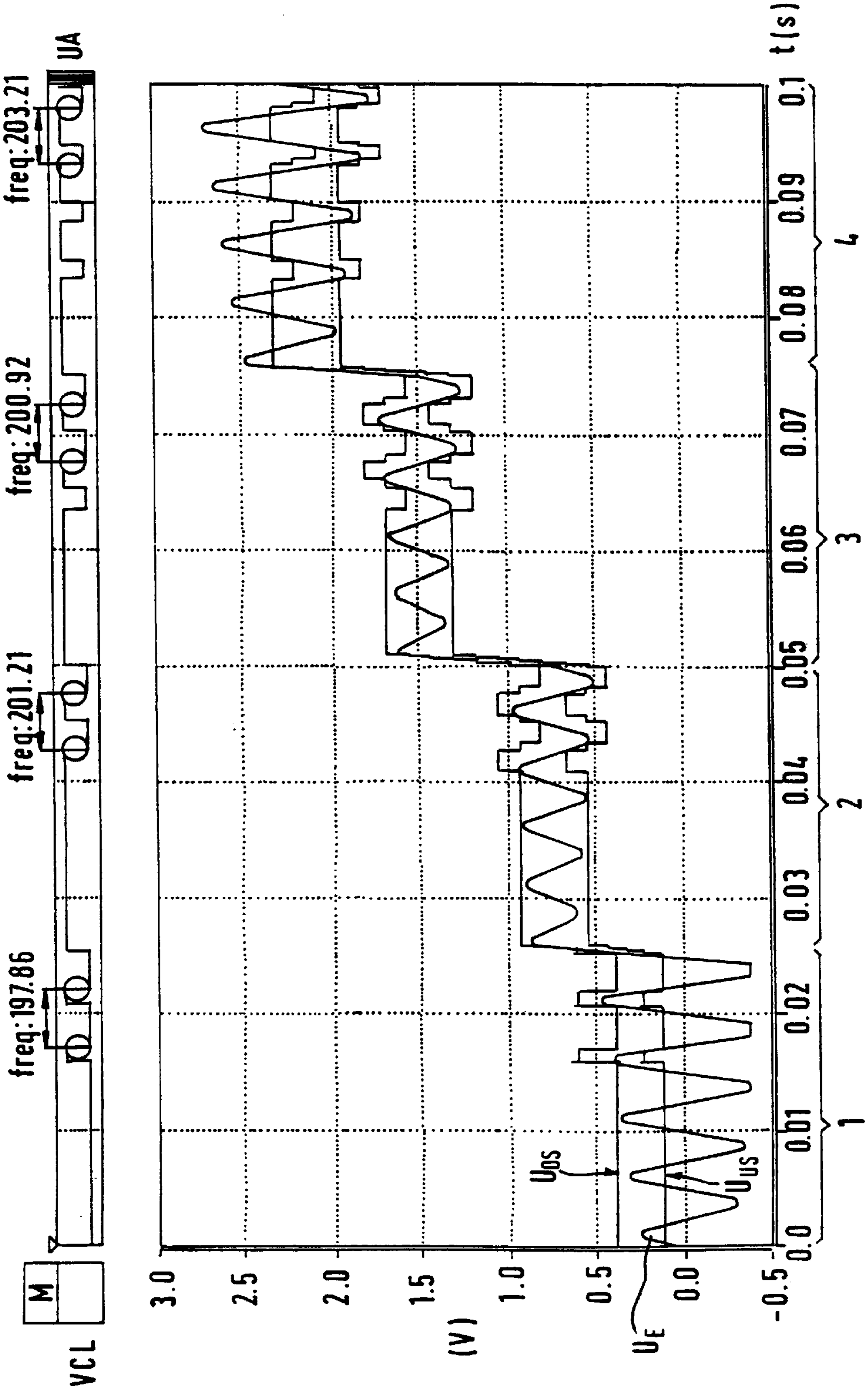
FIG. 4 is a graphical illustration of simulated signal behavior for different conditions.

In regions 2, 3 and 4 of FIG. 4 examples are shown in which the voltage activates a threshold value shift on reaching the upper and lower threshold values. In region 2 the upper threshold value is first achieved and after it is reached both thresholds are increased. When the voltage again drops to the lower threshold, both thresholds are lowered to their original value and, on reaching the lowered thresholds, the counter Z receives a Down-Count signal, whereby both thresholds are reduced about the same amount. Threshold shifts are also fundamentally activated when the phase voltage reaches one of the thresholds.

The phase voltage first reaches the lower threshold in the case of the signal behavior illustrated in region 3. Because of that, a Down-Count signal is fed to the counter first and it counts downward, whereby both thresholds are next reduced. After reaching the upper reduced threshold the threshold is again set back to its original threshold value and on reaching this threshold value an additional threshold increase occurs, whereby both the upper and the lower threshold are changed by the same amount.

The circuit reaches its upper limit stop in the region designated with 4 in FIG. 4. The alternating voltage signal is superimposed on a D.C. voltage that is so high that a further threshold value increase can no longer occur, but only a lowering on reaching the lower threshold occurs. Analysis of the VCL-signal TA is however still possible.

Whether a shaft is rotating, or not, can be determined with the aid of the VCL signal as already mentioned. By measuring of the time intervals between equal sides of the VCL signal the rotation speed may be determined and subsequently processed.

A second embodiment for the threshold adjustment circuit portion SN is shown in FIG. 3. In this embodiment the production of the analysis or evaluation signal TA is the same as in the example according to FIG. 2. The counter is replaced by a switchable current source/current sink in this embodiment. When an Up-Count signal is generated by the window comparator and input to the current/source sink, the capacitor C is charged by a current I from the current source/sink and the lower threshold is increased. The difference between the lower and the upper threshold is maintained a constant with the help of a voltage source that supplies voltage UF.

That means that the upper threshold is increased to the same extent as the lower threshold. If the window comparator generates a Down-Count signal and input to the current source/sink, the capacitor C is discharged accordingly and the threshold is lowered. As long as a stop signal is present, the thresholds remain constant.

If the circuit means for analysis according to the invention is used for analysis of a periodic voltage, an advantageous separation of the alternating component from the D.C. voltage component present is possible and the resulting purely alternating voltage can be processed or analyzed.

The analysis of the phase voltage of a generator permits the determination of the rotation speed of the generator. in the following appended claims and foregoing description "threshold" means an upper or lower voltage or current limit and is a voltage or current value.

While the invention has been illustrated and described as embodied in a circuit means for analysis of an alternating voltage or alternating current signal, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A device for analyzing an alternating voltage or current signal that includes a variable D. C. voltage or D. C. current component, said device comprising:

a window comparator including means for comparing the alternating voltage or current signal to an upper threshold and a lower threshold; and means for adjusting said upper threshold and said lower threshold when one of the upper and the lower thresholds is reached by the alternating voltage or current signal;

wherein said means for adjusting said upper and lower thresholds comprises a threshold adjustment circuit portion, said window comparator includes means for generating control signals for said threshold adjustment circuit portion and said threshold adjustment circuit portion is connected to said window comparator to receive said control signals therefrom;

wherein the threshold adjustment circuit portion includes a counter holding a count and means for converting said count into an auxiliary voltage and for setting the upper threshold and the lower threshold of the window comparator according to the auxiliary voltage; and wherein the control signals from the window comparator include up-count signals, stop signals and down-count signals that activate the counter to count up, that maintain the count and that activate the counter to count down respectively.

2. The device as defined in claim 1, further comprising means for producing a pulsed output signal (VCL) having a plurality of signal sides from the alternating voltage or current signal.

3. The device as defined by claim 1, wherein said threshold adjustment circuit portion includes a flip-flop connected with said window comparator to receive said control signals and said flip-flop has an S-input set by said up-count signals and an R-input is set by said down-count signals, whereby a VCL signal is produced at said D-pulse output.

4. The device as defined in claim 1, wherein said means for converting said count into an auxiliary voltage and for setting the upper threshold and the lower threshold comprises a digital/analog converter.

5. A device for analyzing an alternating voltage or current signal that includes a variable D. C. voltage or D. C. current component, said device comprising:

a window comparator including means for comparing the alternating voltage or current signal to an upper threshold and a lower threshold; and means for adjusting said upper threshold and said lower threshold when one of the upper and the lower thresholds is reached by the alternating voltage or current signal;

wherein said means for adjusting said upper and lower thresholds comprises a threshold adjustment circuit portion, said window comparator includes means for generating control signals for said threshold adjustment circuit portion and said threshold adjustment circuit portion is connected to said window comparator to receive said control signals therefrom;

wherein the control signals from the window comparator include up-count signals, stop signals and down-count signals and the threshold adjustment circuit portion includes a capacitor, a switchable current source and means for switching said capacitor and said current source so that the capacitor is charged by input of a charging current in response to said up-count signals, discharged by output of a discharge current in response to said down-count signals and is maintained at a constant potential in response to said stop signals.

6. The device as defined in claim 5, wherein the threshold adjustment circuit portion includes a constant voltage source connected directly to the capacitor, means for tapping a lower threshold voltage connected between the capacitor and the constant voltage source and means for tapping an upper threshold voltage from a side of the constant voltage source opposite to said means for tapping the lower threshold voltage.

7. The device as defined in claim 5, wherein said threshold adjustment circuit portion includes a flip-flop connected with said window comparator to receive said control signals and said flip-flop has an S-input set by said up-count signals and an R-input is set by said down-count signals, whereby a VCL signal is produced at said D-pulse output.

* * * * *